United States Patent [19]

East et al.

[11] 4,318,841

[45] Mar. 9, 1982

[54] POLYESTER OF 6-HYDROXY-2-NAPHTHOIC ACID, PARA-HYDROXY BENZOIC ACID, TEREPHTHALIC ACID, AND RESORCINOL CAPABLE OF READILY UNDERGOING MELT PROCESSING TO FORM SHAPED ARTICLES HAVING INCREASED IMPACT STRENGTH

[75] Inventors: Anthony J. East, Madison; Gordon W. Calundann, N. Plainfield, both of N.J.

[73] Assignee: Celanese Corporation, New York, N.Y.

[21] Appl. No.: 194,196

[22] Filed: Oct. 6, 1980

[51] Int. Cl.$^3$ ............................................. C08G 63/60
[52] U.S. Cl. ................................... 524/605; 528/190
[58] Field of Search ............................. 260/40 R, 40 P; 528/190

[56] References Cited

U.S. PATENT DOCUMENTS

| | | | |
|---|---|---|---|
| 4,156,070 | 5/1979 | Jackson et al. | 528/191 |
| 4,161,470 | 7/1979 | Calundann | 260/40 R |
| 4,219,461 | 8/1980 | Calundann | 260/40 R |
| 4,224,433 | 9/1980 | Calundann et al. | 528/190 |
| 4,230,817 | 10/1980 | Charbonneau | 528/190 |
| 4,238,599 | 12/1980 | Langley et al. | 528/193 |
| 4,256,624 | 3/1981 | Calundann | 260/40 R |
| 4,265,802 | 5/1981 | Choe | 528/271 |
| 4,279,803 | 7/1981 | Calundann | 260/40 P |

*Primary Examiner*—Maurice J. Welsh
*Attorney, Agent, or Firm*—Charles B. Barris

[57] ABSTRACT

A novel thermotropic polyester is provided which has been found to exhibit an optically anisotropic melt phase at a temperature which enables it readily to undergo melt processing to form quality molded articles, fibers, etc., which exhibit substantial flexibility. For instance, molded articles can be prepared having an unusually high impact strength, toughness, and high extension in addition to other highly satisfactory mechanical properties. The polyester of the present invention contains recurring 6-oxy-2-naphthoyl and p-oxybenzoyl moieties in addition to terephthaloyl moieties and meta-dioxyphenylene moieties in the proportions indicated. Such meta-dioxyphenylene moieties are non-symmetrical in structure. The hydrogen atoms present upon the aromatic rings of these moieties optionally may be at least partially substituted (as described). The wholly aromatic polyester is capable of forming the desired optically anisotropic melt at a temperature below approximately 350° C. and in a particularly preferred embodiment at a temperature below approximately 325° C.

30 Claims, No Drawings

POLYESTER OF 6-HYDROXY-2-NAPHTHOIC ACID, PARA-HYDROXY BENZOIC ACID, TEREPHTHALIC ACID, AND RESORCINOL CAPABLE OF READILY UNDERGOING MELT PROCESSING TO FORM SHAPED ARTICLES HAVING INCREASED IMPACT STRENGTH

BACKGROUND OF THE INVENTION

Wholly aromatic polyester resins long have been known. For instance, 4-hydroxybenzoic acid homopolymer and co-polymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point. Other amorphous wholly aromatic polyesters when molten frequently exhibit an isotropic melt phase. With the crystalline polymers molding techniques such as compression molding or sintering may be utilized; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters from Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems): Homopolymer for Coatings: Copolymers for Compression and Injection Molding*, by Roger S. Storm and Steven G. Cottis, Coating Plast. Preprint, Vol. 34, No. 1, Pages 194 to 197 (April, 1974). See also, U.S. Pat. Nos. 3,039,994; 3,169,121; 3,321,437; 3,549,593; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotropy. See, for instance, (a) *Polyester X7G-A Self Reinforced Thermoplastic*, by W. J. Jackson Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 838,935 and 828,936, (c) Dutch Pat. No. 7505551, (d) West German Nos. 2520819, 2520820, 2722120, 2834535, 2834536 and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,153,779; 4,156,070; 4,159,365; 4,161,470; 4,169,933; 4,181,792; 4,183,895; 4,184,996; and 4,188,476; (g) U.K. Application No. 2,002,404; and (h) European Patent Application No. 0008855. See also commonly assigned U.S. Ser. Nos. 10,392, and 10,393, filed Feb. 8, 1979 and now U.S. Pat. No. 4,238,599 and 4,238,598, issued Dec. 9, 1980; 17,007, filed Mar. 2, 1979 now U.S. Pat. No. 4,230,819 issued Oct. 28, 1980; 21,050, filed Mar. 16, 1979 now U.S. Pat. No. 4,224,433 issued Sept. 23, 1980; 32,086, filed Apr. 23, 1979 now U.S. Pat. No. 4,219,461 issued Aug. 26, 1980; 54,049, filed July 2, 1979 now U.S. Pat. No. 4,256,624 issued Mar. 17, 1981; 91,003, filed Nov. 5, 1979; 109,573, filed Jan. 4, 1980 now U.S. Pat. No. 4,265,802 issued May 5, 1981; 109,574, filed Jan. 4, 1980; 128,759, filed Mar. 10, 1980; and 128,778, filed Mar. 10, 1980 now U.S. Pat. No. 4,279,803 issued July 21, 1981.

In commonly assigned U.S. Pat. No. 4,219,461, is claimed a melt processable wholly aromatic polyester consisting essentially of 6-oxy-2-naphthoyl moieties, p-oxybenzoyl moieties, symmetrical dioxyaryl moieties, and symmetrical dicarboxyaryl moieties in the proportions there indicated. See also commonly assigned U.S. Pat. No. 4,161,470 which claims a melt processable wholly aromatic polyester consisting essentially of 6-oxy-2-naphthoyl moieties and p-oxybenzoyl moieties in the proportions indicated, and U.S. Pat. No. 4,156,070 to Jackson et al and the disclosures discussed therein.

It is an object of the present invention to provide an improved melt processable wholly aromatic polyester which is capable of forming quality molded articles, fibers, etc. which exhibit substantially more flexibility than if formed from the polyester of U.S. Pat. No. 4,219,461, without any significant sacrifice of other highly desirable properties.

It is an object of the present invention to provide an improved melt processable wholly aromatic polyester which is capable of forming molded articles of unusually high impact strength, toughness, and extensibility, in combination with other highly desirable mechanical properties.

It is an object of the present invention to provide an improved melt processable wholly aromatic polyester capable of formng an anisotropic melt phase at a temperature below approximately 350° C., and preferably below approximately 325° C.

It is an object of the present invention to provide an improved wholly aromatic polyester which forms a highly tractable melt phase which exhibits improved moldability.

These and other objects, as well as the scope, nature and utilization of the invention will be apparent to those skilled in the art from the following detailed description.

SUMMARY OF THE INVENTION

It has been found that a melt processable wholly aromatic polyester capable of forming an anisotropic melt phase at a temperature below approximately 350° C. consists essentially of the recurring moieties I, II, III, and IV which may include substitution of at least some of the hydrogen atoms present upon an aromatic ring wherein:

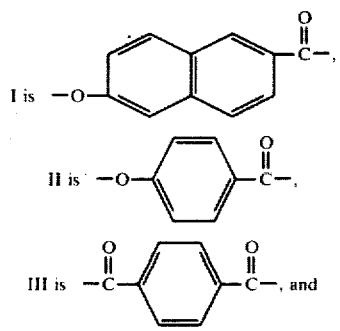

IV is 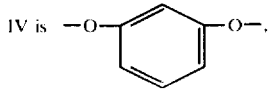

with said optional substitution if present on moieties I and II being selected from the group consisting of an alkyl group of 1 to 4 carbon atoms, an alkoxy group of 1 to 4 carbon atoms, halogen, and mixtures of the foregoing, and if present on moieties III and IV being selected from the group consisting of an alkyl group of 1 to 4 carbon atoms, an alkoxy group of 1 to 4 carbon atoms, phenyl, halogen, and mixtures of the foregoing, and wherein said polyester comprises approximately 5 to 60 mole percent of moiety I, approximately 5 to 70 mole percent of moiety II, approximately 10 to 45 mole percent of moiety III, and approximately 10 to 45 mole percent of moiety IV.

DESCRIPTION OF PREFERRED EMBODIMENTS

The wholly aromatic polyester of the present invention consists essentially of at least four recurring moieties which when combined in the polyester have been found to form an atypical optically anisotropic melt phase at a temperature below approximately 350° C., and preferably below approximately 325° C. (e.g. at approximately 290° to 320° C.). Such aromatic polyester commonly is an amorphous solid when examined by differential scanning calorimetry (i.e., DSC) and X-ray analyses. Accordingly, no sharp melting point is commonly observed. Because of its ability to exhibit anisotropic properties (i.e., liquid crystalline properties) in the melt, the polyester readily can form a product having a highly oriented molecular structure upon melt processing. Preferred polyesters are capable of undergoing melt processing at a temperature in the range of approximately 290° to 320° C. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

Moiety I can be termed a 6-oxy-2-naphthoyl moiety and possesses the structural formula:

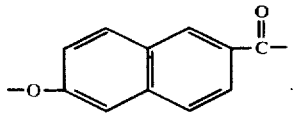

While not specifically illustrated in the structural formula, at least some of the hydrogen atoms present upon the aromatic rings of moiety I may be substituted. Such optional substitution may be an alkyl group of 1 to 4 carbon atoms, an alkoxy group of 1 to 4 carbon atoms, halogen (e.g., Cl, Br, I), and mixtures of the foregoing. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-5-phenyl-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, and its impact strength may be further improved). However, in a preferred embodiment no ring substitution is present.

As will be apparent to those skilled in the art, moiety I can be derived from 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of betanaphthol.

Moiety I comprises approximately 5 to 60 mole percent of the wholly aromatic polyester. In a preferred embodiment moiety I is present in a concentration of approximately 15 to 25 mole percent, and most preferably in a concentration of approximately 20 mole percent.

The second essential moiety (i.e., moiety II) can be termed a p-oxybenzoyl moiety and possesses the structural formula:

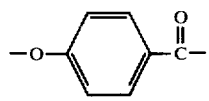

While not specifically illustrated in the structural formula, at least some of the hydrogen atoms present upon the aromatic ring of moiety II may be substituted. Such optional substitution may be an alkyl group of 1 to 4 carbon atoms, an alkoxy group of 1 to 4 carbon atoms, halogen (e.g. Cl, Br, I), and mixtures of the foregoing. Representative examples of ring substituted compounds from which moiety II can be derived include 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 2-bromo-4-hydroxybenzoic acid, 3,5-dibromo-4-hydroxybenzoic acid, 3-bromo-4-hydroxybenzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, etc. The presence of ring substitution in moiety II tends to modify to some degree the physical properties of the resulting polymer as previously described in connection with moiety I. In a preferred embodiment, no ring substitution is present. For instance, moiety II is then derived from unsubstituted p-hydroxybenzoic acid or its derivatives.

Moiety II comprises approximately 5 to 70 mole percent of the wholly aromatic polyester. In a preferred embodiment moiety II is present in a concentration of approximately 25 to 35 mole percent, and most preferably in a concentration of approximately 30 mole percent.

The third essential moiety (i.e., moiety III) is a symmetrical dicarboxyaryl moiety of the formula:

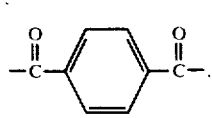

This moiety may be termed a terephthaloyl moiety and may be derived from terephthalic acid or its derivatives. While not specifically illustrated in the structural formula, at least some of the hydrogen atoms present upon the aromatic ring of moiety III may be substituted. Such optional substitution may be an alkyl group of 1 to 4 carbon atoms, an alkoxy group of 1 to 4 carbon atoms, an alkoxy group of 1 to 4 carbon atoms, phenyl, halogen (e.g. Cl, Br, I), and mixtures of the foregoing. Representative examples of ring substituted compounds from which moiety III can be derived include: chloroterephthalic acid, bromoterephthalic acid, methoxyterephthalic acid, ethoxyterephthalic acid, methylterephthalic acid, etc. In a preferred embodiment no ring substitution is present.

Moiety III comprises approximately 10 to 45 mole percent of the wholly aromatic polyester. In a preferred embodiment moiety III is present in a concentration of approximately 20 to 30 mole percent, and most preferably in a concentration of approximately 25 mole percent.

The fourth essential moiety (i.e., moiety IV) is a non-symmetrical dioxyaryl moiety of the formula:

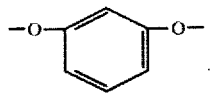

This moiety may be termed a meta-dioxyphenylene moiety, and may be derived from resorcinol or its derivatives. While not specifically illustrated in the structural formula, at least some of the hydrogen atoms present upon the aromatic ring of moiety IV may be substituted. Such optional substitution may be an alkyl group of 1 to 4 carbon atoms, an alkoxy group of 1 to 4 carbon atoms, phenyl, halogen (e.g. Cl, Br, I), and mixtures of the foregoing. Representative examples of ring substituted compounds from which moiety IV can be derived include: 5-methylresorcinol, 4-methylresorcinol, 5-methoxyresorcinol, 4-methoxyresorcinol, 4-chlororesorcinol, etc. In a preferred embodiment no ring substitution is present.

Moiety IV comprises approximately 10 to 45 mole percent of the wholly aromatic polyester. In a preferred embodiment moiety IV is present in a concentration of approximately 20 to 30 mole percent, and most preferably in a concentration of approximately 25 mole percent.

Other aryl ester-forming moieties (e.g. combined oxy and carboxy units, dicarboxy units, dioxy units) other than moieties I, II, III, and IV additionally may be included in the wholly aromatic polyester of the present invention in a minor concentration (e.g., below approximately 10 mole percent) so long as such moieties do not adversely influence the desired optically anisotropic melt phase exhibited by the polyester heretofore defined and do not raise the melting point of the resulting polymer above that specified. As will be apparent to those skilled in the art, the total molar quantities of dicarboxy units and dioxy units present within the wholly aromatic polyester will be substantially equal. In a preferred embodiment the wholly aromatic polyester is formed solely of moieties I, II, III, and IV.

The wholly aromatic polyester of the present invention commonly exhibits

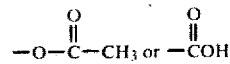

end groups depending upon the synthesis route selected. As will be apparent to those skilled in the art, the end groups optionally may be capped, e.g., acidic end groups may be capped with a variety of alcohols, and hydroxy end groups may be capped with a variety of organic acids. For instance, end capping units such as phenylester

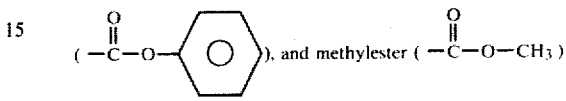

optionally may be included at the end of the polymer chains. The molecular weight of the polymer commonly can be increased by heating the solid polymer in an inert atmosphere. Also, the polymer can be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chlorophenol, and accordingly are not susceptible to solution processing. They can surprisingly be readily processed by common melt processing techniques as discussed hereafter. Most compositions are soluble in pentafluorophenol to at least some degree.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infrared spectroscopy on compression molded films. Alternatively, light scattering techniques in a pentafluorophenol solution may be employed in some instances to determine the molecular weight.

The wholly aromatic polyester prior to heat treatment additionally commonly exhibits an inherent viscosity (i.e., I.V.) of at least approximately 0.4, and preferably at least 1.0 (e.g., approximately 1.0 to 1.5) when dissolved in a concentration of 0.1 percent by weight in pentafluorophenol at 60° C.

Unlike the aromatic polyesters commonly encountered in the prior art, the wholly aromatic polyester of the present invention is not intractable and forms an optically anisotropic melt phase whereby order is manifest in the molten polymer. The subject polyester readily forms liquid crystals in the melt phase and accordingly exhibits a high tendency for the polymer chains to orient in the shear direction. Such optically anisotropic properties are manifest at a temperature which is amenable for melt processing to form shaped articles. Such anisotropy in the melt may be confirmed by conventional polarized light techniques whereby cross-polaroids are utilized. More specifically, the optically anisotropic melt phase may conveniently be confirmed by the use of a Leitz polarizing microscope at a magnification of 40X with the sample on a Leitz hot stage and under a nitrogen atmosphere. The polymer melt transmits light when examined between crossed polaroids. The amount of light transmitted increases when the sample is sheared (i.e., is made to flow). However, the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly assigned U.S. Pat. No. 4,067,852 is described a slurry polymerization process which may be employed to form the wholly aromatic polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852, the organic monomer reactants from which the 6-oxy-2-naphthoyl moiety (i.e., moiety I), the p-oxybenzoyl moiety (i.e., moiety II), and the meta-dioxyphenylene moiety (i.e., moiety IV) are derived may be initially provided in a modified form whereby the usual hydroxyl groups of these monomers are esterified (i.e., they are provided as acyl esters). For instance, lower acyl esters of 6-hydroxy-2-naphthoic acid, p-hydroxybenzoic acid, and resorcinol wherein the hydroxy groups are esterified may be provided as reactants. The lower acyl groups preferably have from about 2 to about 4 carbon atoms. Preferably the acetate esters of the organic compounds which form moieties I, II, and IV are provided. Accordingly, particularly preferred reactants for the condensation reaction are 6-acetoxy-2-naphthoic acid, p-acetoxybenzoic acid, and resorcinol diacetate. If minor quantities of other aryl reactants (as previously discussed) optionally provide oxy-units within the resulting polymer, these too preferably are provided as the corresponding lower acyl esters.

Representative catalysts which optionally may be employed in either the melt hydrolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

As previously indicated, the molecular weight of a previously formed wholly aromatic polyester may be further increased via a solid state polymerization procedure wherein the particulate polymer is heated in a flowing inert gaseous atmosphere (e.g., in a flowing nitrogen atmosphere at a temperature of about 260° C. for 10 to 12 hours).

The wholly aromatic polyester of the present invention readily can be melt processed to form a variety of shaped articles, e.g., molded three-dimensional articles, fibers, films, tapes, etc. The polyester of the present invention is particularly suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight of a solid filler (e.g., talc) and/or reinforcing agent (e.g. glass fibers).

The wholly aromatic polyester also may be employed as a coating material which is applied as a powder or from a liquid dispersion.

It has been found that the polyester of the present invention offers significant advantages when compared to the polyester of commonly assigned U.S. Pat. No. 4,219,461, in that molded articles formed from the same exhibit substantially enhanced impact strength and extensibility. Such enhancement of impact strength and extensibility surprisingly is achieved with no substantial diminution in other highly desirable mechanical properties such as the tensile and flexural strengths.

The following Example is presented as a specific illustration of the claimed invention. It should be understood, however, that the invention is not limited to the specific details set forth in the Example.

EXAMPLE

To a 2000 ml. three-neck, round bottom flask equipped with a sealed glass paddle stirrer, gas inlet tube, and a heating tape wrapped distillation head connected to a condenser were added the following:
(a) 138 grams 6-acetoxy-2-naphthoic acid (0.60 mole),
(b) 162 grams p-acetoxybenzoic acid (0.90 mole),
(c) 124.5 grams terephthalic acid (0.75 mole),
(d) 145.8 grams resorcinol diacetate (0.752 mole), and
(e) 0.12 grams sodium diacetate (catalyst).

The flask was purged by evacuation and flushed twice with dry argon. A slow stream of argon next was passed through the system while an oil bath surrounding the flask was heated to 250° C. As soon the mixture became molten, it was stirred and acetic acid rapidly began to distill. After one hour at 250° C. the temperature of the flask and its contents was raised to 280° C. At this point 127.6 ml. of acetic acid had been collected following distillation and condensation. After one more hour at 280° C. a total of 161 ml. of acetic acid had been collected following distillation and condensation. At this point the contents of the flask were visible as an opaque pale tan melt which was slightly viscous. The temperature of the flask and its contents were next raised to 300° C. where it was maintained for one hour. At the end of this period a total of 167 ml. of acetic acid had been collected following distillation and condensation. The contents of the flask were then darker and opalescent in appearance and were observed to be very viscous. Finally, the melt was heated for 40 minutes at 320° C. At the end of this period a total of 170 ml. of acetic acid had been collected following distillation and condensation which compares to a theoretical total of 189 ml. A vacuum of 0.5 mm. was slowly applied to the flask to minimize frothing of the molten polymer, and the polymerization was continued under this vacuum at 320° C. for two hours. At the end of this period the contents of the flask were very viscous and opaque brown in appearance.

Next the vacuum was released with argon and the contents of the flask were cooled under argon. The solid wholly aromatic polyester of the present invention was removed by breaking the flask, freed from the broken glass, and ground in a Wiley mill. The polymer next was extracted for two hours with acetone in a Soxhlet apparatus to remove any low molecular weight materials present therein.

Upon differential scanning calorimetry analysis the polymer exhibited a strong glass transition inflection at approximately 123° C. No detectable melting point for the polymer was observed since it was an amorphous solid.

The resulting wholly aromatic polyester had an inherent viscosity (I.V.) of 1.02 as determined in a pentafluorophenol solution of 0.1 percent by weight concentration at 60° C.

$$I.V. = \frac{\ln (\eta rel)}{c}$$

wherein c=concentration of solution (0.1 percent by weight), and ηrel=relative viscosity. The relative viscosity was measured by dividing the flow time in a capillary viscometer of the polymer solution by the flow time for the pure solvent.

When the polymer was examined under a polarizing hot stage microscope it was observed to exhibit an optically anisotropic melt at temperatures slightly in excess of 300° C.

For comparative purposes a wholly aromatic polyester of U.S. Pat. No. 4,219,461 was formed. More specifically, hydroquinone diacetate was substituted for resorcinol diacetate and the polymerization procedure of the Example was repeated with the exception that in the Comparative Example the final polymerization was conducted under vacuum at 340° C. rather than 320° C. The polymer was isolated in an identical manner to that employed in the Example, and exhibited an inherent viscosity of 6.6 as determined in a pentafluorophenol solution of 0.1 percent by weight concentration at 60° C. Additionally, the polymer formed for comparative purposes exhibited a glass transition temperature of 90° C. and a melting temperature of 305° C. when examined by differential scanning calorimetry. The polymer melt also was optically anisotropic.

The polymer of the Example and that formed for comparative purposes next were dried overnight at 80° C. under a vacuum and were separately molded into conventional test bars and tensile test pieces on an Arburg Allrounder injection molding machine Model No. 221E/150. The molding conditions employed are as follows.

|  | Example | Comparative Example |
|---|---|---|
| Cylinder Temperature |  |  |
| Rear | 570° F. | 590° F. |
| Front | 570° F. | 590° F. |
| Nozzle | 570° F. | 590° F. |
| Mold Temperature | 70° F. | 70° F. |
| Cycle Times: |  |  |
| Injection | 10 seconds | 10 seconds |
| Cooling | 20 seconds | 20 seconds |
| Delay | 4 seconds | 4 seconds |
| Total | 34 seconds | 34 seconds |
| Screw RPM | 220 | 220 |
| Injection Pressure | 8000 psig | 8000 psig |

The test bars and test pieces next were evaluated. The tensile properties were determined in accordance with ASTM D638, Type V; the flexural properties were determined in accordance with ASTM D790; and the notched Izod impact strength was determined in accordance with ASTM D256.

The following average values were obtained upon the evaluation of five test specimens:

|  | Example | Comparative Example |
|---|---|---|
| Tensile Break, psi | 31,900 | 32,700 |
| Elongation, percent | 9 | 2.5 |
| Tensile Modulus, psi | $0.88 \times 10^6$ | $2.3 \times 10^6$ |
| Flexural Break, psi | 20,400 | 21,200 |
| Flexural Modulus, psi | $0.68 \times 10^6$ | $1.3 \times 10^6$ |
| Notched Izod Impact, ft-lbs. | 19.4 | 4.6 |

These data illustrate that the wholly aromatic polyester of the present invention exhibits a substantial increase in impact strength and elongation without any substantial sacrifice in tensile and flexural break strengths when compared to the wholly aromatic polyester of U.S. Pat. No. 4,219,461.

Although the invention has been described with a preferred embodiment, it is to be understood that variations and modifications may be employed without departing from the concept of the invention as defined in the following claims.

We claim:

1. A melt processable wholly aromatic polyester capable of forming an anisotropic melt phase at a temperature below approximately 350° C. consisting essentially of the recurring moieties I, II, III, and IV which may include substitution of at least some of the hydrogen atoms present upon an aromatic ring wherein:

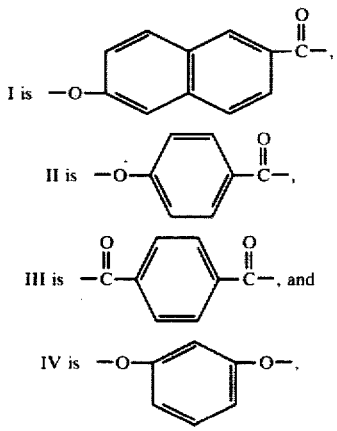

with said optional substitution if present on moieties I and II being selected from the group consisting of an alkyl group of 1 to 4 carbon atoms, an alkoxy group of 1 to 4 carbon atoms, halogen, and mixtures of the foregoing, and if present upon moieties III and IV being selected from the group consisting of an alkyl group of 1 to 4 carbon atoms, an alkoxy group of 1 to 4 carbon atoms, phenyl, halogen, and mixtures of the foregoing, and wherein said polyester comprises approximately 5 to 60 mole percent of moiety I, approximately 5 to 70 mole percent of moiety II, approximately 10 to 45 mole percent of moiety III, and approximately 10 to 45 mole percent of moiety IV.

2. A melt processable wholly aromatic polyester according to claim 1 which is capable of forming an anisotropic melt phase at a temperature below approximately 325° C.

3. A melt processable wholly aromatic polyester according to claim 1 which is capable of undergoing melt processing at a temperature in the range of approximately 290° to 320° C.

4. A melt processable wholly aromatic polyester according to claim 1 which consists essentially of approximately 15 to 25 mole percent of moiety I, approximately 25 to 35 mole percent of moiety II, approximately 20 to 30 mole percent of moiety III, and approximately 20 to 30 mole percent of moiety IV.

5. A melt processable wholly aromatic polyester according to claim 1 wherein each moiety is substantially free of ring substitution.

6. A melt processable wholly aromatic polyester according to claim 1 which exhibits an inherent viscosity of at least 0.4 when dissolved in a concentration of 0.1 percent by weight in pentafluorophenol at 60° C.

7. A melt processable wholly aromatic polyester according to claim 1 which exhibits an inherent viscosity of at least 1.0 when dissolved in a concentration of 0.1 percent by weight in pentafluorophenol at 60° C.

8. A melt processable wholly aromatic polyester according to claim 1 which exhibits an inherent viscosity of 1.0 to 2.0 when dissolved in a concentration of 0.1 percent by weight in pentafluorophenol at 60° C.

9. A molded article comprising the melt processable wholly aromatic polyester of claim 1.

10. A molding compound comprising the melt processable wholly aromatic polyester of claim 1 which incorporates approximately 1 to 60 percent by weight of a solid filler and/or reinforcing agent.

11. A fiber which has been melt spun from the wholly aromatic polyester of claim 1.

12. A film which has been melt extruded from the wholly aromatic polyester of claim 1.

13. A melt processable wholly aromatic polyester capable of forming an anisotropic melt phase at a temperature below approximately 350° C. consisting essentially of the recurring moieties I, II, III, and Iv which are substantially free of ring substitution wherein:

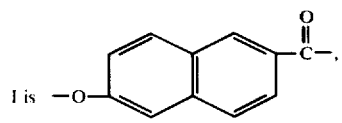

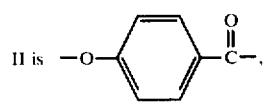

-continued

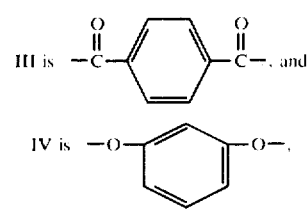

and wherein said polyester comprises approximately 15 to 25 mole percent of moiety I, approximately 25 to 35 mole percent of moiety II, approximately 20 to 30 mole percent of moiety III, and approximately 20 to 30 mole percent of moiety IV.

14. A melt processable wholly aromatic polyester according to claim 13 which is capable of forming an anisotropic melt phase at a temperature below approximately 325° C.

15. A melt processable wholly aromatic polyester according to claim 13 which is capable of undergoing melt processing at a temperature in the range of approximately 290° to 320° C.

16. A melt processable wholly aromatic polyester according to claim 13 which exhibits an inherent viscosity of at least 0.4 when dissolved in a concentration of 0.1 percent by weight in pentafluorophenol at 60° C.

17. A melt processable wholly aromatic polyester according to claim 13 which exhibits an inherent viscosity of at least 1.0 when dissolved in a concentration of 0.1 percent by weight in pentafluorophenol at 60° C.

18. A molded article comprising the melt processable wholly aromatic polyester of claim 13.

19. A molding compound comprising the melt processable wholly aromatic polyester of claim 13 which incorporates approximately 1 to 60 percent by weight of a solid filler and/or reinforcing agent.

20. A fiber which has been melt spun from the wholly aromatic polyester of claim 13.

21. A film which has been melt extruded from the wholly aromatic polyester of claim 13.

22. A melt processable wholly aromatic polyester capable of forming an anisotropic melt phase at a temperature below approximately 325° C. consisting essentially of the recurring moieties I, II, III, and IV which are substantially free of ring substitution wherein:

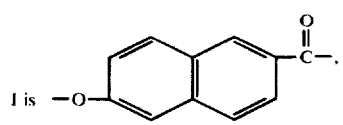

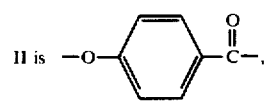

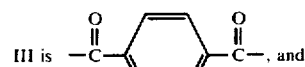

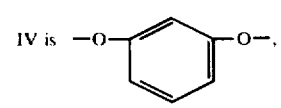

and wherein said polyester comprises approximately 20 mole percent of moiety I, approximately 30 mole percent of moiety II, approximately 25 mole percent of moiety III, and approximately 25 mole percent of moiety IV.

23. A melt processable wholly aromatic polyester according to claim 22 which is capable of undergoing melt processing at a temperature in the range of approximately 295° to 310° C.

24. A melt processable wholly aromatic polyester according to claim 22 which exhibits an inherent viscosity of at least 0.4 when dissolved in a concentration of 0.1 percent by weight in pentafluorophenol at 60° C.

25. A melt processable wholly aromatic polyester according to claim 22 which exhibits an inherent viscosity of at least 1.0 when dissolved in a concentration of 0.1 percent by weight in pentafluorophenol at 60° C.

26. A melt processable wholly aromatic polyester according to claim 22 which exhibits an inherent viscosity of approximately 1.0 to 1.5 when dissolved in a concentration of 0.1 percent by weight in pentafluorophenol at 60° C.

27. A molded article comprising the melt processable wholly aromatic polyester of claim 22.

28. A molding compound comprising the melt processable wholly aromatic polyester of claim 22 which incorporates approximately 1 to 60 percent by weight of a solid filler and/or reinforcing agent.

29. A fiber which has been melt spun from the wholly aromatic polyester of claim 22.

30. A film which has been melt extruded from the wholly aromatic polyester of claim 22.

* * * * *